United States Patent
Yang

(10) Patent No.: US 10,692,275 B2
(45) Date of Patent: *Jun. 23, 2020

(54) ASSIGNING PRIMITIVES TO TILES IN A GRAPHICS PROCESSING SYSTEM

(71) Applicant: Imagination Technologies Limited, Kings Langley (GB)

(72) Inventor: Xile Yang, Rickmansworth (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/115,165

(22) Filed: Aug. 28, 2018

(65) Prior Publication Data

US 2018/0365885 A1     Dec. 20, 2018

Related U.S. Application Data

(63) Continuation of application No. 14/718,576, filed on May 21, 2015, now Pat. No. 10,096,150.

(30) Foreign Application Priority Data

Jun. 17, 2014   (GB) .................................. 1410800.5

(51) Int. Cl.
     *G06T 17/00*         (2006.01)
     *G06T 15/20*         (2011.01)
     (Continued)

(52) U.S. Cl.
     CPC .............. *G06T 15/205* (2013.01); *G06T 7/13* (2017.01); *G06T 7/507* (2017.01); *G06T 7/529* (2017.01); *G06T 15/005* (2013.01); *G06T 15/04* (2013.01); *G06T 15/40* (2013.01); *G06T 17/10* (2013.01); *G06T 17/205* (2013.01); *G06T 19/20* (2013.01);
(Continued)

(58) Field of Classification Search
None
See application file for complete search history.

(56) References Cited

U.S. PATENT DOCUMENTS

| | | | |
|---|---|---|---|
| 6,246,415 B1 | 6/2001 | Grossman et al. | |
| 6,445,389 B1 * | 9/2002 | Bossen | G06T 17/20 345/420 |

(Continued)

FOREIGN PATENT DOCUMENTS

EP     1659538 B1     1/2008

*Primary Examiner* — Anh-Tuan V Nguyen
(74) *Attorney, Agent, or Firm* — Potomac Law Group PLLC; Vincent M DeLuca

(57) ABSTRACT

A tiling unit assigning primitives to tiles in a graphics processing system which has a rendering space subdivided into a plurality of tiles. Each tile can comprise one or more polygonal region. Mesh logic of the tiling unit can determine that a plurality of primitives form a mesh and can determine whether the mesh entirely covers a region. If the mesh entirely covers the region then a depth threshold for the region can be updated so that subsequent primitives which lie behind the depth threshold are culled (i.e. not included in the display list for a tile). This helps to reduce the number of primitive IDs included in a display list for a tile which reduces the amount of memory used by the display list and reduces the number of primitives which a hidden surface removal (HSR) module needs to fetch to perform HSR on the tile.

19 Claims, 9 Drawing Sheets

(51) Int. Cl.
*G06T 15/00* (2011.01)
*G06T 15/40* (2011.01)
*G06T 7/507* (2017.01)
*G06T 7/529* (2017.01)
*G06T 7/13* (2017.01)
*G06T 15/04* (2011.01)
*G06T 17/10* (2006.01)
*G06T 17/20* (2006.01)
*G06T 19/20* (2011.01)

(52) U.S. Cl.
CPC ...... *G06T 2200/04* (2013.01); *G06T 2200/28* (2013.01); *G06T 2207/10004* (2013.01); *G06T 2207/10028* (2013.01); *G06T 2207/20004* (2013.01); *G06T 2207/20192* (2013.01); *G06T 2215/16* (2013.01); *G06T 2219/2016* (2013.01)

(56) References Cited

U.S. PATENT DOCUMENTS

| | | |
|---|---|---|
| 6,525,726 B1 | 2/2003 | Xie et al. |
| 6,577,305 B1 | 6/2003 | Duluk, Jr. et al. |
| 6,597,363 B1 | 7/2003 | Duluk, Jr. et al. |
| 6,879,324 B1 | 4/2005 | Hoppe |
| 8,228,328 B1 | 7/2012 | French et al. |
| 8,502,818 B1 | 8/2013 | Mueller-Fischer |
| 8,508,544 B1 | 8/2013 | Molnar et al. |
| 8,558,833 B1 | 10/2013 | Moreton |
| 8,860,742 B2 * | 10/2014 | Shebanow ............... G09G 5/36 345/556 |
| 8,976,169 B1 * | 3/2015 | Barreirinhas ........... G06T 15/04 345/419 |
| 2002/0196252 A1 | 12/2002 | Liao et al. |
| 2003/0142103 A1 * | 7/2003 | Hussain ................ G06T 11/40 345/545 |
| 2003/0160787 A1 * | 8/2003 | Buehler ................ G06T 15/06 345/421 |
| 2003/0164823 A1 | 9/2003 | Baldwin et al. |
| 2005/0057571 A1 * | 3/2005 | Stevens ..................... G06F 1/32 345/501 |
| 2005/0122338 A1 * | 6/2005 | Hong ................... G06T 15/005 345/546 |
| 2005/0264554 A1 | 12/2005 | Deming |
| 2005/0285850 A1 | 12/2005 | Heim et al. |
| 2006/0114261 A1 | 6/2006 | Morphet |
| 2008/0068375 A1 | 3/2008 | Min et al. |
| 2008/0259076 A1 * | 10/2008 | Meinds ................ G06T 15/005 345/423 |
| 2008/0273033 A1 * | 11/2008 | Brennan .................. G06T 1/60 345/422 |
| 2009/0046098 A1 | 2/2009 | Barone et al. |
| 2009/0066694 A1 * | 3/2009 | Redshaw ............. G06T 15/005 345/423 |
| 2011/0267346 A1 | 11/2011 | Howson |
| 2012/0001909 A1 | 1/2012 | Garg |
| 2012/0229464 A1 | 9/2012 | Fishwick |
| 2012/0293515 A1 * | 11/2012 | Clarberg ................ G06T 15/10 345/441 |
| 2013/0069943 A1 | 3/2013 | Kallio et al. |
| 2013/0120380 A1 | 5/2013 | Kallio et al. |
| 2013/0120391 A1 | 5/2013 | Brown |
| 2014/0118364 A1 | 5/2014 | Hakura |
| 2014/0267238 A1 | 9/2014 | Lum et al. |
| 2014/0347357 A1 | 11/2014 | Kim et al. |
| 2014/0354640 A1 * | 12/2014 | Nystad .................... G06T 15/40 345/421 |
| 2014/0354682 A1 | 12/2014 | Heggelund et al. |
| 2015/0042650 A1 * | 2/2015 | Kim ...................... G06T 15/005 345/423 |
| 2015/0049107 A1 | 2/2015 | Park |
| 2015/0103087 A1 | 4/2015 | Rouet et al. |
| 2015/0109293 A1 * | 4/2015 | Wang ........................ G06T 1/60 345/422 |
| 2015/0161815 A1 | 6/2015 | Andersson et al. |

* cited by examiner

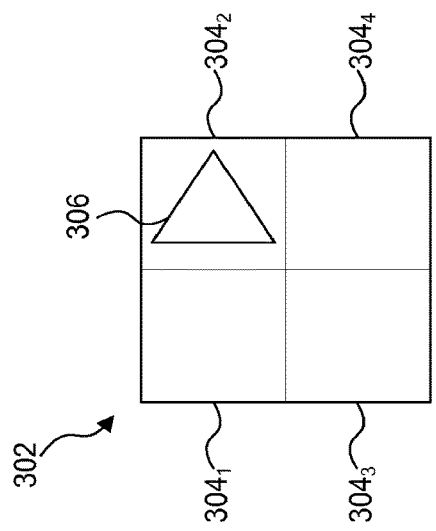
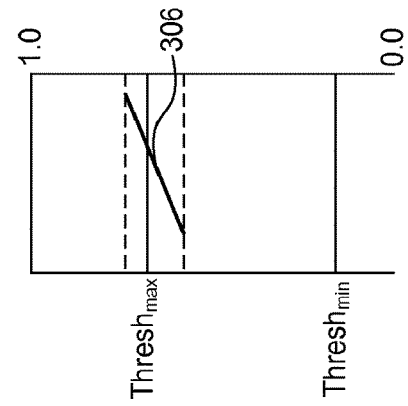
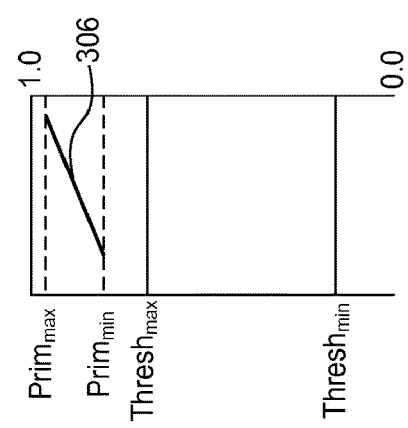
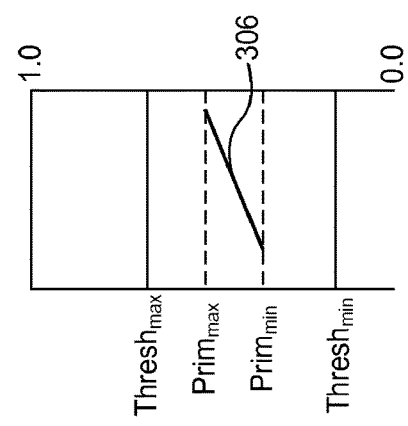
FIGURE 3a
FIGURE 3b
FIGURE 3c
FIGURE 3d

ASSIGNING PRIMITIVES TO TILES IN A GRAPHICS PROCESSING SYSTEM

BACKGROUND

Graphics processing systems are used to process graphics data. For example, an application running on a computing system may need to render an image of a three dimensional (3D) scene for display to a user. The application can send graphics data, typically in the form of a sequence of primitives to a graphics processing system which can render the image of the scene in accordance with the primitives.

FIG. 1 shows some basic elements of a graphics processing system 100 which may be used to render an image of a 3D scene. The graphics processing system 100 comprises a graphics processing unit (GPU) 102 and two portions of memory $104_1$ and $104_2$. It is noted that the two portions of memory $104_1$ and $104_2$ may, or may not, be parts of the same physical memory, and both memories $104_1$ and $104_2$ may be situated "off-chip", i.e. not on the same chip as the GPU 102. Communication between the memories ($104_1$ and $104_2$) and the GPU 102 may take place over a communications bus in the system 100.

In the example shown in FIG. 1, the graphics processing system 100 is a tile-based deferred rendering system, meaning that the rendering space of the system 100 is divided into a plurality of tiles and that hidden surface removal is performed on a primitive fragment prior to performing texturing and/or shading on the primitive fragment in order to render the scene. However, in other examples, graphics processing systems may be non tile-based and/or not deferred rendering systems. The GPU 102 comprises a pre-processing module 106, a tiling unit 108 and a rasterization module 110, wherein the rasterization module 110 comprises a hidden surface removal (HSR) module 112 and a texturing/shading module 114. The graphics processing system 100 is arranged such that a sequence of primitives provided by an application is received at the pre-processing module 106. The pre-processing module 106 performs functions such as geometry processing including clipping and culling to remove primitives which do not fall into a visible view. The pre-processing module 106 may also project the primitives into screen-space. The pre-processing module 106 may also put the received primitives into primitive blocks.

The primitives (e.g. in primitive blocks) which are output from the pre-processing module 106 are passed to the tiling unit 108 which determines which primitives are present within each of the tiles of the rendering space of the graphics processing system 100. The tiling unit 108 assigns primitives to tiles of the rendering space by creating display lists for the tiles, wherein the display list for a tile includes indications of primitives (i.e. primitive IDs) which are present within the tile. The display lists and the primitives (e.g. in primitive blocks) are outputted from the tiling unit 108 and stored in the memory $104_1$. The rasterization block 110 fetches the display list for a tile and the primitives relevant to that tile from the memory $104_1$ and the HSR module 112 performs hidden surface removal to thereby remove fragments of primitives which are hidden in the scene. The remaining fragments are passed to the texturing/shading module 114 which performs texturing and/or shading on the fragments to determine pixel colour values of a rendered image which can be passed to the memory $104_2$ for storage in a frame buffer. The rasterization block 110 processes primitives in each of the tiles and when the whole image has been rendered and stored in the memory $104_2$, the image can be outputted from the graphics processing system 100 and, for example, displayed on a display.

Increasing the number of primitives which are present within a tile will typically increase the number of primitive IDs included in the display list for the tile. This means that the amount of data included in the display list is increased, thereby using a greater amount of the memory $104_1$ for storing the display list and increasing the amount of data that is passed between the tiling unit 108 and the memory $104_1$. Furthermore, the display list is read by the HSR module 112 from the memory $104_1$ and the primitives which are indicated in the display list are fetched by the HSR module 112 from the memory $104_1$. Communication between the GPU 102 and the memory $104_1$ is a relatively slow process (compared to processes performed on the same chip as the GPU 102), therefore it may be beneficial to reduce the amount of data that the GPU 102 writes to the memory $104_1$ and/or reads from the memory $104_1$.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of assigning primitives to tiles in a graphics processing system which has a rendering space subdivided into a plurality of tiles, wherein each tile comprises one or more polygonal regions for which depth comparisons are to be performed, the method comprising:

receiving a plurality of primitives forming a mesh;
identifying external edges of the mesh;
identifying intersection points where the identified external edges of the mesh intersect with lines aligned with the edges of a polygonal region of a tile, and using the identified intersection points to determine whether the mesh entirely covers the polygonal region of the tile; and for each of a plurality of the received primitives which are present within the polygonal region of the tile:
  (i) comparing a first depth value for the primitive with a depth threshold for the region; and
  (ii) in dependence on the result of the comparison, selectively including an indication of the primitive in a display list for the tile to thereby assign the primitive to the tile;

the method further comprising:
if it is determined that the mesh entirely covers the polygonal region of the tile, updating the depth threshold for the polygonal region in dependence on a comparison of the depth threshold for the polygonal region with a second depth value for at least one of said plurality of the received primitives of the mesh which is present within the polygonal region of the tile.

For example, the step of using the identified intersection points to determine whether the mesh entirely covers the polygonal region of the tile may comprise, for each edge of the polygonal region, determining whether a pair of consecutive intersection points on the line aligned with the edge encompass the edge of the region on the line, with the section between the consecutive intersection points on the line being within the mesh, wherein if, for each edge of the polygonal region, a pair of consecutive intersection points encompass the edge of the region with the section between the consecutive intersection points on the line being within the mesh, then it is determined that the mesh entirely covers the region. Alternatively, the step of using the identified intersection points to determine whether the mesh entirely covers the polygonal region of the tile may comprise: determining whether there are any intersection points on the edges of the polygonal region; and determining that at least one point on an edge of the region is covered by the mesh; wherein if there are no intersection points on the edges of the polygonal region and at least one point on an edge of the region is covered by the mesh, then it is determined that the mesh entirely covers the region.

There is also provided a tiling unit configured to assign primitives to tiles in a graphics processing system which has a rendering space subdivided into a plurality of tiles, wherein each tile comprises one or more polygonal regions for which depth comparisons are to be performed, the tiling unit being configured to receive a plurality of primitives forming a mesh, wherein the tiling unit comprises:

mesh logic configured to:
identify external edges of the mesh;
identify intersection points where the identified external edges of the mesh intersect with lines aligned with the edges of a polygonal region of a tile; and
use the identified intersection points to determine whether the mesh entirely covers the polygonal region of the tile;

tiling logic configured to, for each of a plurality of the received primitives which are present within the polygonal region of the tile:
compare a first depth value for the primitive with a depth threshold for the region; and
in dependence on the result of the comparison, selectively include an indication of the primitive in a display list for the tile to thereby assign the primitive to the tile; and depth threshold updating logic configured to, if it is determined that the mesh entirely covers the polygonal region of the tile, update the depth threshold for the polygonal region in dependence on a comparison of the depth threshold for the polygonal region with a second depth value for at least one of said plurality of the received primitives of the mesh which is present within the polygonal region of the tile.

There may also be provided computer readable code adapted to perform the steps of any of the methods described herein when the code is run on a computer. Furthermore, there may be provided computer readable code for generating a tiling unit according to any of the examples described herein. The computer readable code may be encoded on a computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 3a shows an example of a first primitive being present within a region of a tile;

FIG. 3b illustrates the depth of the first primitive in a first example;

FIG. 3c illustrates the depth of the first primitive in a second example;

FIG. 3d illustrates the depth of the first primitive in a third example;

Figure 1:
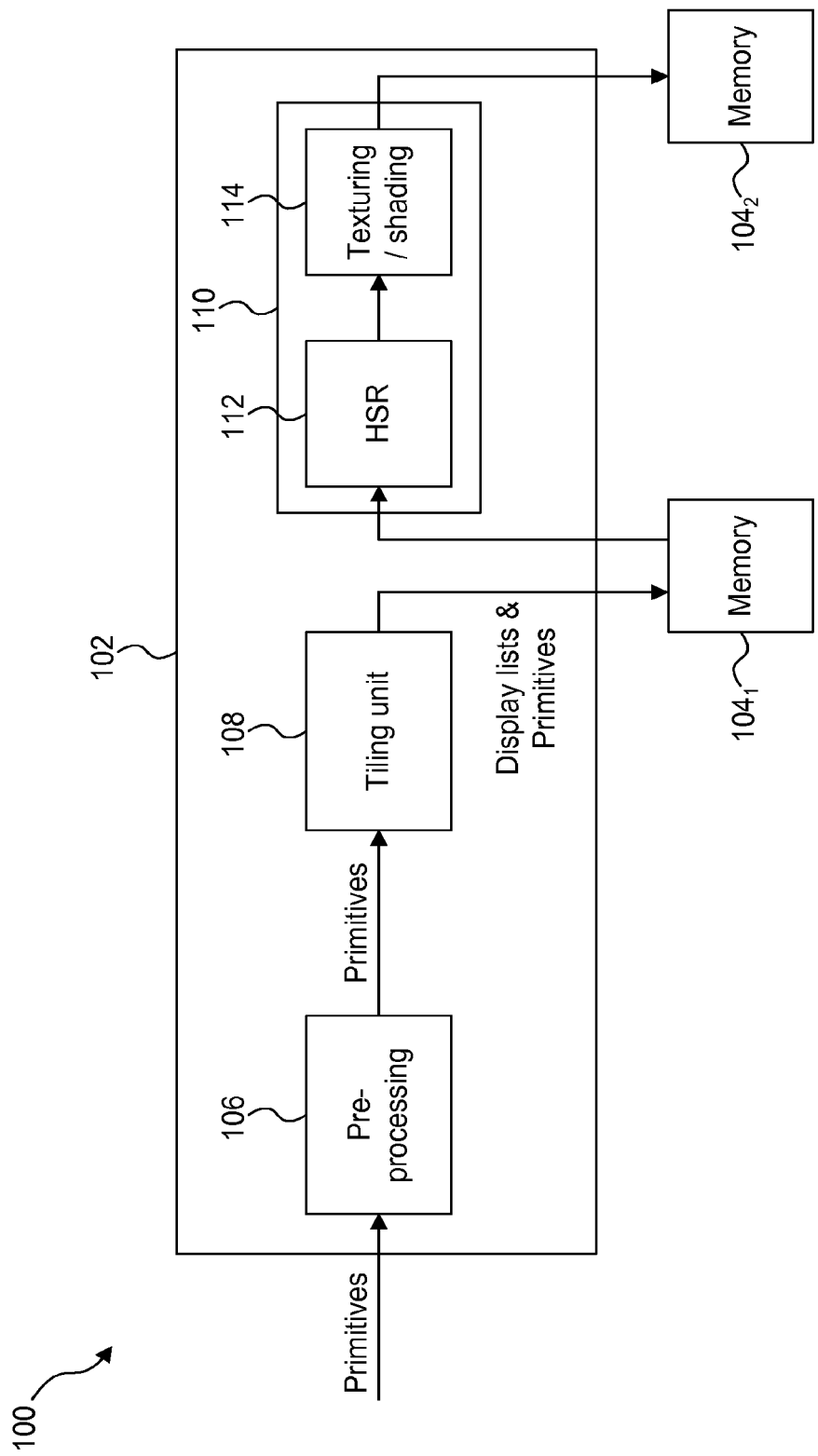
FIG. 1 is a schematic diagram of a graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Figure 2:
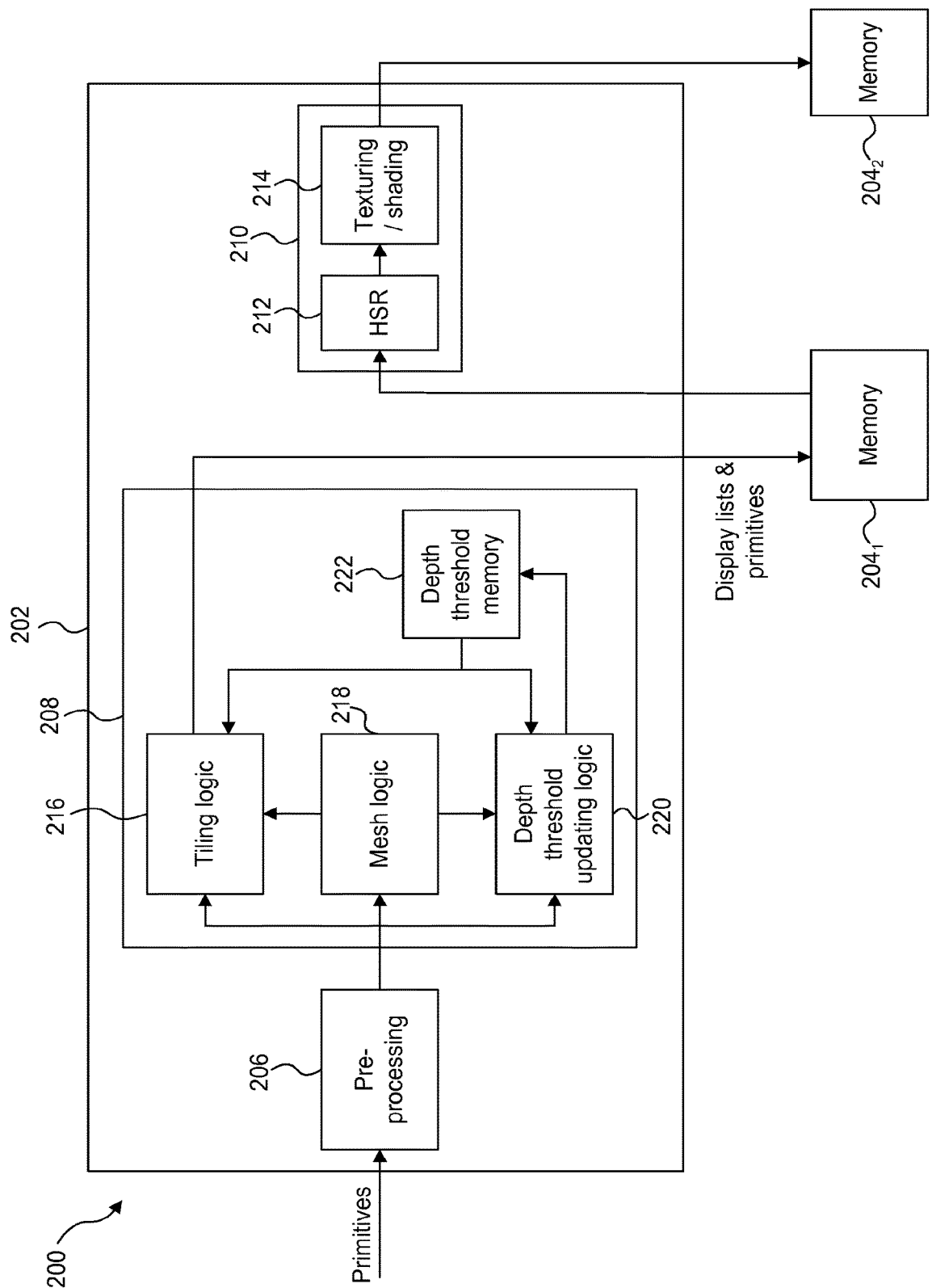
FIG. 2 is a schematic diagram of a graphics processing system showing components of a tiling unit within the graphics processing system.

With reference to the graphics processing system 100 shown in FIG. 1, it would be beneficial if primitives which will eventually be determined to be hidden by other primitives by the HSR module 112 do not have their primitive IDs included in the relevant display list for the tile. This would reduce the amount of data in the display lists and would also reduce the amount of primitive data that would be fetched by the HSR module 112. Examples described herein relate to a tiling unit 208 implemented in a graphics processing system 200 (shown in FIG. 2 and described in detail below). Other than the tiling unit 208, the system 200 is similar to the system 100 shown in FIG. 1. In order to reduce the number of primitives that are included in the display lists, the tiling unit 208 can cull some primitives which it determines are hidden by other primitives in the image. The tiling unit 208 does not perform a full depth test at the sample-resolution at which the HSR module performs depth tests because it would be expensive for the tiling unit to include sufficient memory to store a full-resolution depth buffer for the whole rendering space. It is noted that the HSR module stores a full resolution depth buffer for a tile of the rendering space, but usually not for the whole rendering space. A full resolution depth buffer for only a single tile is possible, in the HSR module of a tile based system, because the tiling unit 208 has already performed spatial sorting (also known as tiling or binning) of the primitives. Although the tiling unit 208 does not store a full-resolution depth buffer for the rendering space, it can still store some depth information which can be used to cull some primitives. Primitives received by the tiling unit 208 may not have been spatially sorted and therefore may have any position in the rendering space. Therefore, any depth information stored in the tiling unit 208 must represent the whole rendering space. For example, the rendering space is divided into a plurality of tiles which are usually rectangular (e.g. each tile may comprise a block of 32×32 or 16×16 or 32×16 samples of the rendering space to give some examples), but may be other shapes and/or sizes, e.g. triangular or hexagonal. Each tile may comprise one or more regions for which depth comparisons are to be performed, wherein if each tile comprises only one region then the regions are tiles, and wherein if each tile comprises more than one region then the regions within a tile are referred to as "subtiles". For each region, the tiling unit 208 can store a depth threshold indicating a threshold depth wherein if a primitive fails a depth test against the depth threshold it can be determined that the primitive is hidden within the region. If a primitive is hidden for all of the one or more regions of a tile then the primitive can be culled from the tile, i.e. the primitive's ID is not included in the display list for the tile.

Although the tiling unit 208 does not store full-resolution depth values of previously processed primitives, the depth threshold for a region can be updated if a primitive covers the whole region, as described in more detail below. However, primitives are generally getting smaller as graphics data becomes more complex, such that primitives infrequently entirely cover a region. This means that the opportunities for updating the depth threshold for a region based on a primitive entirely covering the region may be reduced. However, the inventor has realised that primitives are often parts of meshes, and that if a primitive mesh entirely covers a region then the depth threshold for the region may be updated. This provides many more opportunities for updating the depth threshold for a region in the tiling unit 208. In turn this means that many more primitives can be culled, thereby reducing the amount of memory used by the display lists and reduce the number of primitives that the HSR module will fetch. That is, when a mesh entirely covers a region the depth threshold can be set such that subsequent primitives can be culled if they are hidden by the primitives of the mesh in the region. For example, in testing it has been shown that in some cases the tiling unit 208 can cull approximately 25% of the primitives received at the tiling unit 208, so it can be appreciated that this can provide a significant benefit.

Furthermore, as described below, if a primitive, or a mesh of primitives entirely covers all of the regions of the tile such that all of the previous primitives in the tile are obscured (i.e. hidden) then a start pointer of the display list can be moved to thereby skip the obscured primitives. In this way, the HSR module will not fetch the primitives which would ultimately be hidden by the primitive or the mesh which entirely covers the region. This method therefore reduces the number of primitives which are fetched by the HSR module.

In the examples described herein there are references to there being a display list for each tile, wherein the display list for a tile includes indications of primitives (i.e. primitive IDs) which are present within the tile. In some examples each tile may have a separate display list which is stored as a separate data structure. However, it is noted that in some other examples, there is not necessarily a separate data structure acting as a separate display list for each separate tile. However, even in these cases, for each tile, there is a display list that indicates which primitives are present within the tile, and in that sense there is a display list for each tile. That is, the same data structure may include primitive IDs for more than one tile with indications as to which tile each primitive ID relates, such that the data structure can act as a display list for more than one tile. In other words, conceptually it makes sense to think of there being a separate display list for each tile, whereas in reality in some examples the display lists for multiple tiles may be combined into a single data structure with indications as to which tile each primitive ID in the data structure relates. Throughout this application there are references to display lists for tiles, and such references are intended to cover examples in which separate display lists are implemented as separate data structures and also examples in which the display lists for multiple tiles may be combined into a single data structure with indications as to which tile each primitive ID in the data structure relates.

Embodiments will now be described by way of example only.

As mentioned above, FIG. 2 shows some elements of a graphics processing system 200 which may be used to render an image of a 3D scene. The graphics processing system 200 comprises a GPU 202 and two portions of memory $204_1$ and $204_2$. It is noted that the two portions of memory $204_1$ and $204_2$ may, or may not, be parts of the same physical memory, and both memories $204_1$ and $204_2$ may be situated "off-chip", i.e. not on the same chip as the GPU 202. Communication between the memories ($204_1$ and 2042) and the GPU 202 may take place over a communications bus in the system 200. The graphics processing system 200 is a tile-based deferred rendering system, meaning that the rendering space of the system 200 is divided into a plurality of tiles and that HSR is performed on a fragment prior to performing texturing and/or shading on the fragment in order to render the scene. However, in other examples, graphics processing systems may be non tile-based and/or not deferred rendering systems.

The GPU 202 comprises a pre-processing module 206, a tiling unit 208 and a rasterization module 210, wherein the rasterization module 210 comprises a hidden surface removal (HSR) module 212 and a texturing/shading module 214. The tiling unit 208 comprises tiling logic 216, mesh logic 218, depth threshold updating logic 220, and a depth threshold memory 222. As a person skilled in the art would appreciate, the graphics processing system 200 shown in FIG. 2 may be part of a larger computer system (e.g. a smart phone, tablet, laptop, PC, TV, set top box, etc.) which, as described below with reference to FIG. 11, may comprise other elements such as a central processing unit (CPU), other memories and other devices (such as a display, speakers, microphone, keypad, etc.) which may be able to communicate with each other, e.g. over a communications bus.

FIG. 3a shows an example of a rendering space 302 which is subdivided into four tiles $304_1$, $304_2$, $304_3$ and $304_4$. A primitive 306 is present within the tile $304_2$, but the primitive does not entirely cover the tile $304_2$. In this example the tiles are regions for which depth thresholds are stored and for which depth comparisons are to be performed. The tiling unit 208 can store one, two or more depth thresholds for each of the tiles $304_n$. For example, the tiling unit 208 may store a maximum depth threshold and a minimum depth threshold for each tile $304_n$. The different depth thresholds may be useful when different depth compare modes are being used. If only one depth compare is used then the tiling unit 208 might store only one depth threshold for each tile. Storing both maximum and minimum depth thresholds for a region allows for changes in the depth compare mode.

The graphics processing system 200 can use a variety of different depth compare modes, and may switch between them. For example, the depth compare mode may be one of "less than" (DCM_LESS), "less than or equal to" (DCM_LESS_EQ), "greater than" (DCM_GREATER), "greater than or equal to" (DCM_GREATER_EQ), "equal" (DC- M_EQ), "not equal" (DCM_NOT_EQ), "always" (DCM ALWAYS) or "never" (DCM NEVER).

The DCM_LESS depth compare mode is a common depth compare mode because it corresponds to rendering in a coordinate system where the depth value increases with increasing distance from the viewer. A primitive or fragment of a primitive with a depth value less than that of another primitive or fragment of a primitive is closer to the viewer and therefore is rendered in front of the other primitive. Other depth compare modes support alternative coordinate systems or other rendering effects. Depth compare modes are traditionally used for full resolution hidden surface removal in the HSR module 212, but must also be considered when performing primitive culling in the tiling unit 208. In the DCM_LESS depth compare mode the tiling unit 208 will determine that the primitive 306 passes a depth test if it has a depth value which is less than the maximum depth threshold in the region $304_2$. FIG. 3b shows a first example of the depth of the primitive 306. The range of possible depth values extends from 0.0 to 1.0 in the example shown in FIG. 3b and the maximum and minimum depth thresholds for the region $304_2$, denoted "$Thresh_{max}$" and "Threshmin" respectively, represent a range of depths established by previously rendered primitives. In the example shown in FIG. 3b the primitive 306 has a maximum depth Primmax and a minimum depth value Primmin. In the DCM_LESS depth compare mode the tiling unit 208 tests whether $Prim_{min} < Thresh_{max}$. In the example shown in FIG. 3b this test is passed so the primitive is not culled and its ID is included in the display list for the tile. FIG. 3c shows a second example in which the primitive 306 has a larger depth than the maximum depth threshold for the region $304_2$. Therefore, in the example shown in FIG. 3c the primitive will fail the test of whether $Prim_{min} < Thresh_{max}$. This means that, at every possible position in the tile, the primitive is hidden behind some other primitive that has already been processed. It cannot possibly be visible. Since this test is failed then the primitive is culled such that its ID is not included in the display list for the tile. FIG. 3d shows a third example in which the maximum depth of the primitive ($Prim_{max}$) is greater than the maximum threshold ($Thresh_{max}$) but it is still the case that $Prinn_{min} < Thresh_{max}$. This means that, at some positions in the tile, the primitive may be visible. Full resolution depth testing in the HSR module 112 will be required to accurately determine visibility, so in the example shown in FIG. 3d, the primitive 306 passes the depth test, it is not culled and its ID is included in the display list for the tile 3042.

If the depth compare mode was DCM_GREATER then the relevant test to determine whether a primitive ID should be included in the display list is to determine whether $Prim_{max} > Thresh_{min}$. A person skilled in the art will understand which test to perform in different depth compare modes to determine whether a primitive should be culled or not.

Since the primitive 306 does not entirely cover the tile 3042, the depth threshold(s) for the tile $304_2$ are not updated due to the primitive 306.

Figure 4C:
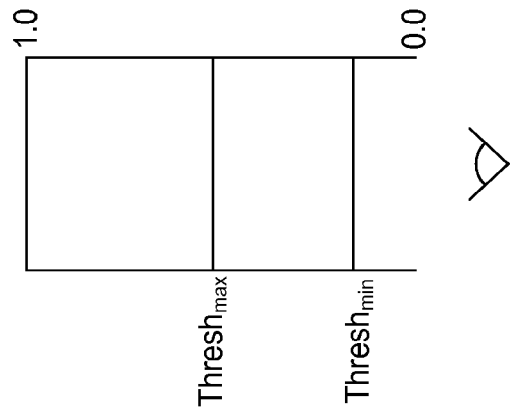
FIG. 4c shows an example of how a depth threshold is updated due to the second primitive.
Figure 4B:
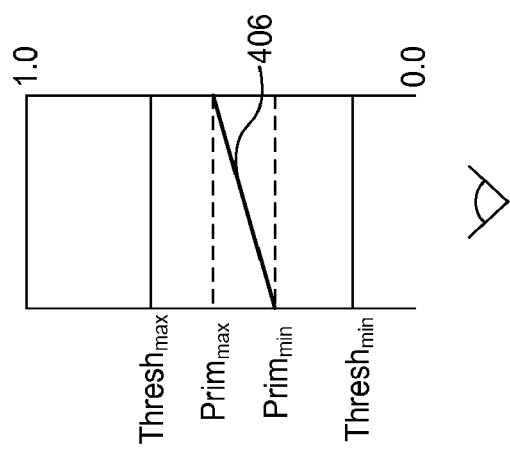
FIG. 4b illustrates the depth of the second primitive in an example.
Figure 4A:
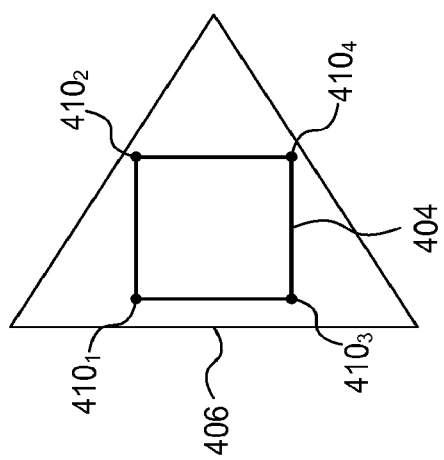
FIG. 4a shows an example of a second primitive entirely covering a region.

However, FIG. 4a shows another example in which a primitive 406 entirely covers a region 404. The region 404 may be a tile or a subtile. In this example, the primitive 406 is opaque and is convex. The tiling unit 208 can determine that the convex primitive 406 entirely covers the region 404 by testing whether each of the four corners of the region 404 (denoted $410_1$, $410_2$, $410_3$ and $410_4$ in FIG. 4a) are inside the primitive 406. In other examples, a primitive might not be convex, in which case a different test should be performed to determine whether the primitive entirely covers the region. For example, a test similar to that described below for a concave mesh may be performed for a concave primitive. FIG. 4b represents the depth of the primitive 406 in the region 404. It can be seen in this case that both the maximum and minimum depth values of the primitive 406 in the region 404 ($Prim_{min}$ and $Prim_{max}$) are less than the maximum depth threshold $Thresh_{max}$ for the region 404. Therefore, in the DCM_LESS depth compare mode, the primitive 406 is not culled (since $Prim_{min} < Thresh_{max}$). Furthermore, since $Prim_m < Thresh_m$ and since the primitive 406 covers the entire region 404, the maximum depth threshold for the region 404 can be updated to be equal to the maximum depth of the primitive 406, i.e. $Thresh_{max}$ is set to be equal to Primmax. This is because it is known that after primitive 406 has been processed by HSR module 212, any pixel that is further away than primitive 406 will have been replaced by a pixel from primitive 406. There will therefore be no pixels in the tile with a depth value greater than the maximum depth of primitive 406. FIG. 4c shows the depth thresholds for the region 404 after the maximum depth threshold for the region has been updated. Since the primitive 406 covers the whole region 404, any subsequent primitive in the region 404 which has depth values greater than the maximum depth of the primitive 406 will be hidden by the primitive 406. By setting the maximum depth threshold for the region 404 to be equal to the maximum depth of the primitive 406 (i.e. by setting $Thresh_{max} = Prim_{max}$) the depth threshold can be used to cull subsequent primitives.

It is noted that the depth threshold(s) for the region should only be updated by primitives which cannot have their depth values or their presence altered by the texturing and shading module 214. For example, the depth threshold(s) for the region may be updated by opaque or translucent primitives but not by punch through primitives for which the visibility of pixels in the primitives are shader-dependent or depth feedback primitives which have shader-dependent depth values.

The updating of the depth threshold described above with reference to FIGS. 4a to 4c is useful, but it is limited to situations in which a primitive entirely covers a region. As mentioned above, as graphics processing systems get more complex the average size of primitives is generally decreasing especially in modern 3D graphics contents and it is becoming less likely that a single primitive will entirely cover a tile. Even if the regions are subtiles rather than tiles, it may still be unlikely that a single primitive entirely covers a subtile. Therefore the opportunities for updating the depth threshold(s) for the regions are limited based on occurrences of a single primitive entirely covering a region.

However, primitives are often part of larger primitive meshes. For example, an application may send a mesh of primitives to the graphics processing system 200, wherein the mesh of primitives has been produced prior to being sent to the graphics processing system 200. Furthermore, a complex shape can be represented by a patch (e.g. a Bezier patch) which is a parametric function defined by a set of control points which describe the shape of a curve. Tessellation is a technique which involves breaking up a patch into a plurality of tessellated primitives. These tessellated primitives will form a mesh. Tessellation such as this creates a mesh of primitives "on-the-fly" as the primitives are processed by the graphics processing system 200. The method described above with reference to FIGS. 4a to 4c can be adapted so that the depth threshold(s) for a region may be updated when a mesh entirely covers the region even if none of primitives of the mesh when considered in isolation would completely cover the region. This provides many more opportunities for updating the depth threshold(s) for a region.

Figure 5:
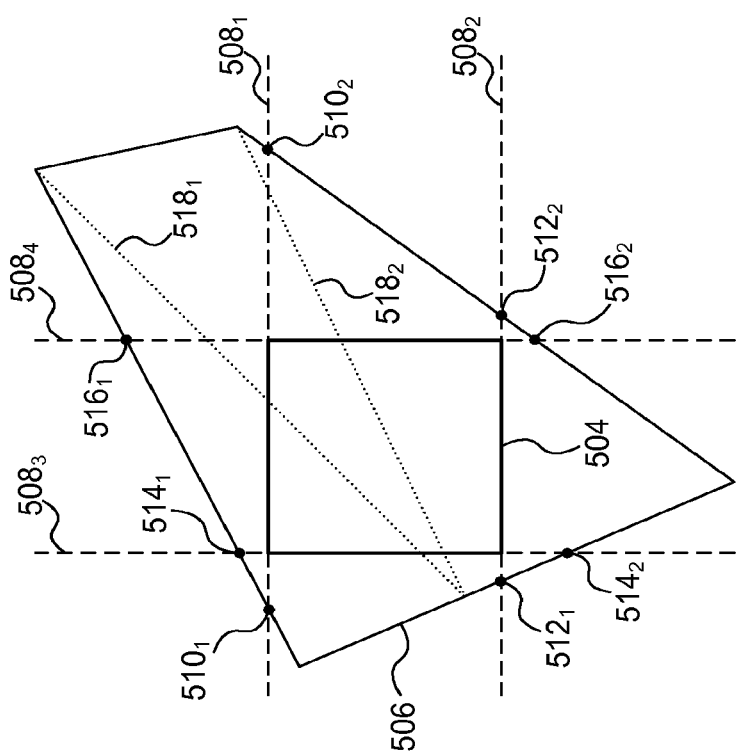
FIG. 5 shows an example of a first mesh of primitives which entirely covers a region.

For example, FIG. 5 shows a mesh 506 which includes three primitives. The dotted lines shown in FIG. 5 (denoted $518_1$ and $518_2$) represent shared edges of primitives of the mesh 506. If two primitives share an edge then they can be considered to be part of a mesh. FIG. 5 shows a region 504 which may be a tile or a subtile of the rendering space of the graphics processing system 200. It can be seen in FIG. 5 that no single one of the three primitives of the mesh 506 entirely covers the region, but that collectively the mesh 506 does entirely cover the region 504.

With reference to the flow chart shown in FIG. 6 there is described below a method of operating the tiling unit 208 so as to provide more opportunities for updating the depth threshold(s) of a region based on the coverage of meshes rather than based on the coverage of singular primitives.

Primitives are received at the pre-processing module 206 of the GPU 202. The primitives may be received from an application which is running in the same computer system as the GPU 202. The pre-processing module 206 performs functions such as geometry processing including clipping and culling to remove primitives which do not fall into a visible view. The pre-processing module 206 may also project the primitives into screen-space. The pre-processing module 206 may also put the received primitives into primitive blocks.

The primitives (e.g. in primitive blocks) are output from the pre-processing module 206 and in step S602 the primitives are received at the tiling unit 208. The primitives are passed to the tiling logic 216, the mesh logic 218 and to the depth threshold updating logic 220 of the tiling unit 208.

In step S604 the mesh logic 218 determines that the received primitives form a mesh, e.g. by determining that primitive edges are shared by a plurality of the received primitives. For example, the mesh logic 218 determines that the three primitives shown in FIG. 5 form a mesh 506 by determining that the edges 5181 and $518_2$ are shared by the primitives. The primitives may be received in primitive blocks and the primitives within a primitive block can be analysed to determine whether any of them form meshes. In other examples, an indication of the start and end of a mesh in the sequence of primitives may be included in the stream of primitives so that the mesh logic 218 can easily determine whether a plurality of primitives form a mesh.

In step S606 the mesh logic 218 identifies external edges of the mesh 506. The external edges of the mesh 506 describe the outer edges (from the rendering viewpoint) of the mesh formed by the plurality of primitives. For example, the external edges of the mesh 506 may be identified by identifying primitive edges which are not shared by multiple primitives of the mesh 506. As can be seen in FIG. 5, the shared edges $518_1$ and $518_2$ are internal edges of the mesh 506 and the edges of the primitives of the mesh 506 which are not shared by more than one of the primitives are the external edges of the mesh 506. It is the external edges of the mesh 506 which describe the extent of the coverage of the mesh 506.

When the mesh logic 218 has identified the external edges of the mesh 506 then the mesh logic 218 determines whether the mesh 506 entirely covers the region. In order to do this, the mesh logic 218 uses lines $508_n$ which are aligned with (and extending from) the edges of the region 504. It is noted that the region 504 is a polygonal region such that it is described by a plurality of straight edges. In the example shown in FIG. 5, the polygonal region 504 is a square but in other examples the region could be other polygonal shapes, e.g. a rectangle, a triangle or a hexagon. Since the region 504 is polygonal, it has straight edges with which lines (e.g. the lines $508_1$, $508_2$, $508_3$ and $508_4$) can be aligned. The line $508_1$ is aligned with the top edge of the region 504; the line $508_2$ is aligned with the bottom edge of the region 504; the line $508_3$ is aligned with the left edge of the region 504; and the line $508_4$ is aligned with the right edge of the region 504. In step S608 the mesh logic 218 identifies intersection points (e.g. points $510_1$, $510_2$, $512_1$, $512_2$, $514_1$, $514_2$, $516_1$ and $516_2$ shown in FIG. 5) where the identified external edges of the mesh 506 intersect with the lines 5081, 5082, $508_3$ and 5084. These intersection points are used to determine whether the mesh 506 entirely covers the region 504, as described below with reference to step S614.

While the mesh logic 218 is performing steps S604, S606 and S608, the tiling logic 216 can be performing steps S610 and S612. The tiling logic 216 determines first depth values for the primitives of the mesh 506 which are present within the region 504. In step S610 the tiling logic 216 compares the first depth value of each of the received primitives which are present in the region 504 with a depth threshold for the region 504. For example, one or both of the maximum and minimum depth thresholds ($Thresh_{max}$ and $Thresh_{min}$) for the region 504 can be read from the depth threshold memory 222 and compared with depth values of the primitives which are present within the region 504. The purpose of this comparison is to determine whether a primitive can be culled because it is hidden by previous primitives which are present in the region 504. Therefore, in the less than depth compare mode (DCM_LESS) or the less than or equal to depth compare mode (DCM_LESS_EQ) the "first depth value" of a primitive is the minimum depth value of the primitive within the region, referred to as $Prim_{min}$. Since in the example described herein the primitives are planar, the minimum depth value of a primitive within the region 504 will be the minimum of the depth values of the primitive at one of: (i) an intersection of an edge of the primitive with an edge of the region 504; (ii) the position of a corner of the region 504 within the primitive; and (iii) a vertex of the primitive within the region 504.

In the less than depth compare mode (DCM_LESS), in step S610 the tiling logic tests whether $Prim_{min} < Thresh_{max}$. In the less than or equal to depth compare mode (DCM_LESS_EQ), in step S610 the tiling logic tests whether $Prim_{m;n} < Thresh_{max}$. If the test is passed then the primitive is not to be culled but if this test is failed then the primitive is to be culled.

In the greater than depth compare mode (DCM_GREATER) or the greater than or equal to depth compare mode (DCM_GREATER_EQ) the "first depth value" of a primitive is the maximum depth value of the primitive within the region, referred to as Primmax• Since in the example described herein the primitives are planar, the maximum depth value of a primitive within the region 504 will be the maximum of the depth values of the primitive at one of: (i) an intersection of an edge of the primitive with an edge of the region 504; (ii) the position of a corner of the region 504 within the primitive; and (iii) a vertex of the primitive within the region 504.

In the greater than depth compare mode (DCM_GREATER), in step S610 the tiling logic tests whether $Prim_{max} > Thresh_{min}$. In the greater than or equal to depth compare mode (DCM_GREATER_EQ), in step S610 the tiling logic tests whether PrirnmaxThreshmin. If the test is passed then the primitive is not to be culled but if this test is failed then the primitive is to be culled.

In step S612 the tiling logic 216 selectively includes an indication of a primitive in a display list for the relevant tile in dependence on the result of the comparison in step S610. Including a primitive ID in the display list for a tile means that the primitive is not culled and that the primitive is assigned to the tile. In contrast, not including the primitive ID in the display list means that the primitive may be culled, at least in respect of the current tile. The display lists are stored in the memory $204_1$ and the tiling logic 216 processes the primitives to add primitive IDs to the display lists stored in the memory $204_1$.

The display lists are per-tile in the sense that they indicate which primitives are present within each tile. This is so that the HSR module 212 can retrieve a display list for a tile without dependency on whether the tiling unit 208 operates with regions that are tiles or subtiles. However, the depth thresholds are determined per-region in the sense that the maximum and/or minimum depth thresholds refer to depths of primitives within a particular region. If the regions are tiles then the depth thresholds and the display lists refer to the same area of the rendering space, but if the regions are subtiles then the depth thresholds and the display lists do not refer to the same area of the rendering space. This means that when the regions are subtiles, if a primitive fails the test against the depth threshold for a region then the primitive might still be visible within another subtile of the same tile and therefore may still ultimately be included in the display list for the tile. For this reason it makes sense to conceptually consider step S612 as a step of including a primitive ID in a display list for a tile when the primitive passes a depth test for a region of the tile in step S610, rather than considering step S612 as a step of culling a primitive from a tile when the primitive fails a depth test for a region of the tile in step S610.

In step S614 the mesh logic 218 uses the intersection points determined in step S608 to determine whether the mesh 506 entirely covers the region 504. The intersection points may be used to determine whether the mesh 506 entirely covers the region 504 in different ways in different examples. For example, the mesh logic 218 may determine whether the mesh entirely covers the region 504 by, for each edge of the region 504, determining whether a pair of consecutive intersection points on the line 508 aligned with the edge encompass the edge of the region on the line, with the section between the consecutive intersection points on the line being within the mesh 504. If, for each edge of the region 504, a pair of consecutive intersection points encompass the edge of the region 504 with the section between the consecutive intersection points on the line 508 being within the mesh 506, then it is determined that the mesh 506 entirely covers the region.

For example, on the line $508_1$, the intersection points $510_1$ and $510_2$ are consecutive in the sense that there are no intersection points of the line $508_1$ with the external edges of the mesh 506 between the two intersection points $510_1$ and $510_2$. Furthermore, the intersection points $510_1$ and $510_2$ do encompass the top edge of the region 504, i.e. there is no part of the top edge of the region 504 that lies outside of the section of the line $508_1$ between the intersection points $510_1$ and $510_2$. Furthermore, the section of the line $508_1$ between the intersection points $510_1$ and $510_2$ is within the mesh 506 (i.e. not outside of the mesh 506). Therefore, for the top edge of the region 504, the conditions are satisfied. Furthermore, in the example shown in FIG. 5 the conditions are satisfied for each of the edges of the region 504. That is, for the bottom edge of the region 504 the intersection points $512_1$ and $512_2$ are consecutive and do encompass the bottom edge of the region 504 on a section of the line $508_2$ which is within the mesh 506. Furthermore, for the left edge of the region 504 the intersection points $514_1$ and $514_2$ are consecutive and do encompass the left edge of the region 504 on a section of the line $508_3$ which is within the mesh 506. Furthermore, for the right edge of the region 504 the intersection points $516_1$ and $516_2$ are consecutive and do encompass the right edge of the region 504 on a section of the line 5084 which is within the mesh 506. Therefore, in step S614, the mesh logic 218 determines that the mesh 506 does entirely cover the region 504.

As another example of how the intersection points may be used to determine whether the mesh 506 entirely covers the region 504, the mesh logic 218 may determine whether there are any intersection points on the edges of the polygonal region 504 and determine that at least one point on an edge of the region 504 is covered by the mesh 506. If there are no intersection points on the edges of the region 504 and at least one point on an edge of the region 504 is covered by the mesh 506, then the mesh logic 218 determines that the mesh 506 entirely covers the region 504. For example, none of the intersection points ($510_1$, $510_2$, $512_1$, $512_2$, $514_1$, $514_2$, $516_1$ or $516_2$) are on the edge of the region 504 and at least one point on an edge of the region is covered by the mesh 506, so it can be determined that the mesh 506 entirely covers the region 504.

It is noted that the method described above in relation to determining whether a single primitive entirely covers a region cannot be reliably applied to meshes (which may be concave). That is, determining whether all four corners of the region 504 are within the mesh 506 does not determine whether mesh 506 entirely covers the region 504.

Figure 7:
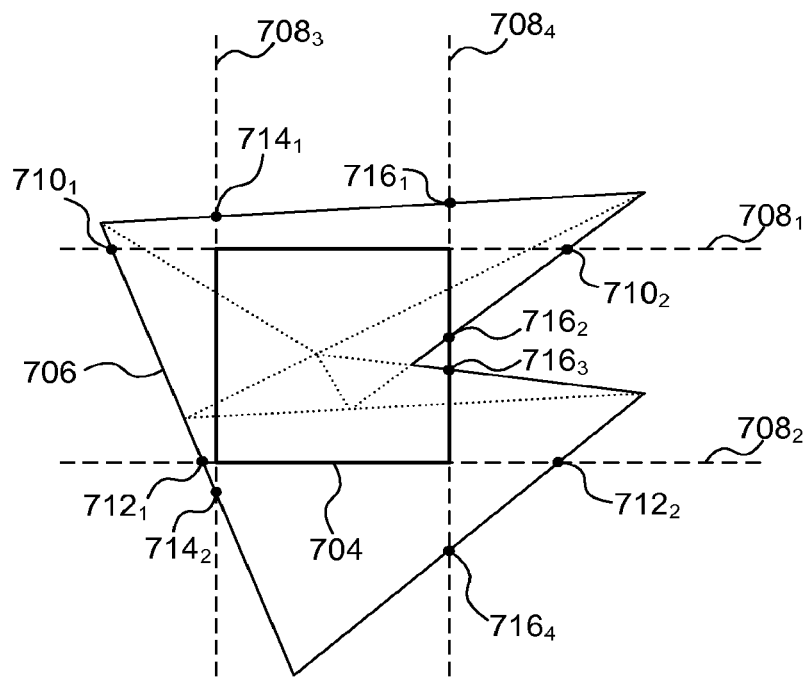
FIG. 7 shows an example of a second mesh of primitives which does not entirely cover a region.

For example, FIG. 7 shows a more complicated mesh 706 which partially, but not entirely, covers a region 704. The mesh 706 comprises seven primitives and the shared edges between the primitives are shown as dotted lines in FIG. 7. It can be seen that the mesh 706 is concave. This means that it is possible for all four corners of the region 704 to be within the mesh 706 but for the mesh 706 to not entirely cover the region 704, which is the case as shown in FIG. 7. This is not possible for a single, convex primitive. Therefore the method of determining whether the four corners of the region 704 are within the mesh 706 would incorrectly determine that the mesh 706 entirely covers the region 704.

However, to correctly determine whether the mesh 706 entirely covers the region 704, the mesh logic 218 determines the intersection points of the external edges of the mesh 706 with the lines $708_1$, $708_2$, $708_3$ and $708_4$ which are aligned with the top, bottom, left and right edges of the region 704 respectively. The intersection points are shown in FIG. 7 as points denoted $710_1$, $710_2$, $712_1$, $712_2$, $714_1$, $714_2$, 7161, 7162, $716_3$ and $716_4$. It can be seen that for the right edge of the region 704 there is not a pair of consecutive intersection points on the line $708_4$ which entirely encompass the right edge of the region 704. It is noted that the intersection points $716_1$ and $716_4$, which do encompass the right edge of region 704, are not consecutive intersection points because the intersection points $716_2$ and $716_3$ lie on the line $708_4$ between the intersection points $716_1$ and $716_4$. Therefore, for this first reason, it can be determined that the mesh 706 does not entirely cover the region 704. Furthermore, it can be seen that the intersection points $716_2$ and $716_3$ both lie on the right hand edge of the region 704. Therefore, for this second reason, it can also be determined that the mesh 706 does not entirely cover the region 704. The use of the intersection points to determine whether the mesh 706 entirely covers the region 704 is a more robust method than determining whether the four corners of the region 704 lie within the mesh 706.

If the mesh logic 218 determines that the mesh 706 does not entirely cover the region 704 then the method passes from step S614 to step S620 which is described below. In this case, the mesh logic 218 provides a signal to the depth threshold updating logic 220 to indicate that the mesh 706 does not entirely cover the region 704, such that the depth updating threshold logic 220 does not attempt to update the depth threshold(s) for the region 704.

However, if the mesh logic 218 determines that a mesh does entirely cover a region then the method passes from step S614 to step S616. In this case, the mesh logic 218 provides a signal to the depth threshold updating logic 220 to indicate that the mesh does entirely cover the region, such that the depth updating threshold logic 220 does attempt to update the depth threshold for the region 704.

Figure 8:
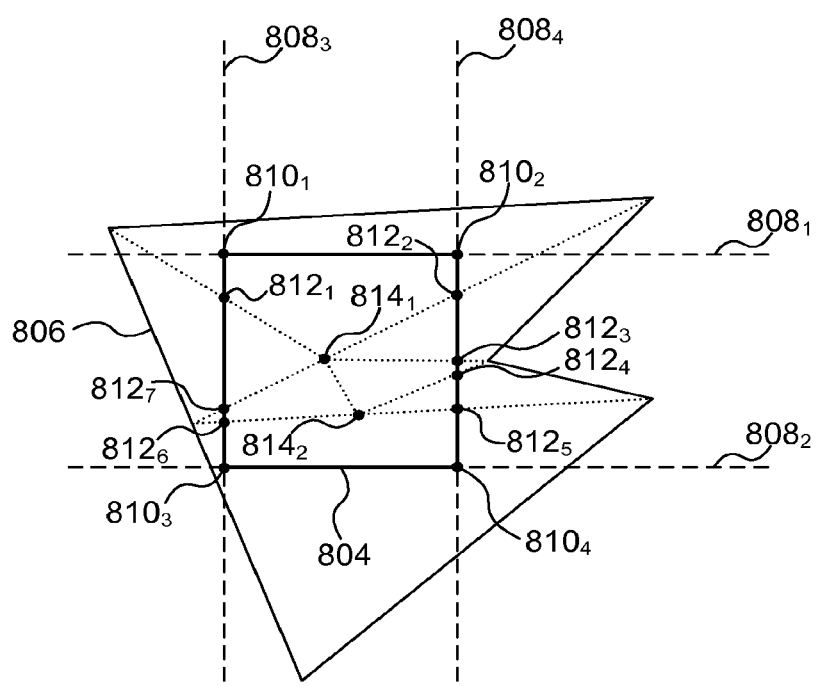
FIG. 8 shows an example of a third mesh of primitives which entirely covers a region.

FIG. 8 shows another example of a complex mesh 806 which is very similar to the mesh 706 shown in FIG. 7, and which includes seven primitives. However, the mesh 806 does entirely cover the region 804, and it can be seen that the method of determining the intersection points of the external edges of the mesh 806 with the lines $808_1$, $808_2$, $808_3$ and $808_4$ will determine that the mesh 806 entirely covers the region 804. The region 804 may be any suitable region of the rendering space, e.g. a tile or a subtile.

The depth threshold updating logic 220 receives the primitives and determines a second depth value for at least one of the primitives of the mesh 806 within the region 804, as described below. The depth threshold updating logic 220 also retrieves the depth threshold(s) for the region 804 from the depth threshold memory 222. Responsive to receiving an indication from the mesh logic 218 that the mesh 806 entirely covers the region 804, in step S616 the depth threshold updating logic 220 compares the second depth value for the at least one of the primitives of the mesh 806 within the region 804 with the depth threshold for the region 804. For example, one or both of the maximum and minimum depth thresholds (Thresh. and $Thresh_{min}$) for the region 804 can be retrieved from the depth threshold memory 222 and compared with depth values of the primitives of the mesh 806 which are present within the region 804. The purpose of this comparison is to determine whether to update the depth threshold(s) for the region 804. Therefore, in the less than depth compare mode (DCM_LESS) or the less than or equal to depth compare mode (DCM_LESS_EQ) the "second depth value" is the maximum depth value of any of the primitives of the mesh 806 within the region 804 (which is referred to herein as "$Mesh_{max}$"). In these depth compare modes, step S616 involves determining whether Mesh.<$Thresh_{max}$. Since in the example described herein the primitives are planar, the maximum depth value of the primitives of the mesh 806 within the region 804 (Mesh.) will be the maximum of the depth values of the primitives of the mesh 806 at one of:
  (i) an intersection of an edge of a primitive of the mesh 806 (irrespective of whether the edge is external or internal to the mesh 804) with an edge of the region 804, where such intersection points are denoted in FIG. 8 by the points $812_1$, $812_2$, $812_3$, $812_4$, $812_5$, $812_6$ and 8127;
  (ii) the position of a corner of the region 804 within a primitive of the mesh 806, such positions are denoted in FIG. 8 by the points 8101, 8102, $810_3$ and $810_4$; and
  (iii) a vertex of a primitive of the mesh 806 within the region 804, where such vertices are denoted in FIG. 8 by the points 8141 and 8142.

In step S618 the depth threshold updating logic 220 updates a depth threshold for the region 804 in dependence on the comparison performed in step S616. For example, in the less than depth compare mode (DCM_LESS) or the less than or equal to depth compare mode (DCM_LESS_EQ) then the maximum depth threshold for the region 804 (Thresh.) is updated to be equal to $Mesh_{max}$ if $Mesh_{max}$<$Thresh_{max}$. The updated depth threshold for the region 804 is stored in the depth threshold memory 222 and can be used by the tiling logic 216 for culling subsequent primitives in steps S610 and S612.

In the greater than depth compare mode (DCM_GREATER) or the greater than or equal to depth compare mode (DCM_GREATER_EQ) the "second depth value" is the minimum depth value of any of the primitives of the mesh 806 within the region 804 (which is referred to herein as "$Mesh_{min}$"). In these depth compare modes, step S616 involves determining whether $Mesh_{min}$<$Thresh_{min}$. Similarly to as described above, since in the example described herein the primitives are planar, the minimum depth value of the primitives of the mesh 806 within the region 804 ($Mesh_{min}$) will be the minimum of the depth values of the primitives of the mesh 806 at one of:
  (i) an intersection of an edge of a primitive of the mesh 806 (irrespective of whether the edge is external or internal to the mesh 804) with an edge of the region 804, where such intersection points are denoted in FIG. 8 by the points $812_1$, $812_2$, $812_3$, $812_4$, $812_5$, $812_6$ and 8127;
  (ii) the position of a corner of the region 804 within a primitive of the mesh 806, such positions are denoted in FIG. 8 by the points $810_1$, $810_2$, $810_3$ and $810_4$; and
  (iii) a vertex of a primitive of the mesh 806 within the region 804, where such vertices are denoted in FIG. 8 by the points $814_1$ and 8142.

In the greater than depth compare mode (DCM_GREATER) or the greater than or equal to depth compare mode (DCM_GREATER_EQ), in step S618 the depth threshold updating logic 220 updates the minimum depth threshold for the region 804. $Thresh_{min}$ is updated to be equal to $Mesh_{min}$ if $Mesh_{min}$>$Thresh_{min}$. The updated depth threshold for the region 804 is stored in the depth threshold memory 222 and can be read by the tiling logic 216 from the memory 222 for use in culling subsequent primitives in steps S610 and S612.

It is noted that step S616 and S618 would be performed for updating the depth thresholds for the region 504 shown in FIG. 5 because the region 504 is entirely covered by the region 506.

In step S620 it is determined whether there are more regions of the rendering space to consider with the primitives of the mesh. That is, it is determined whether the mesh extends over other regions. If the mesh does extend over other regions then the method passes back to step S608 and the method repeats from that step for the next region.

If there are no more regions to consider for the mesh then the method passes from step S620 to step S622. In step S622 it is determined whether more primitives have been received at the tiling unit 208, e.g. primitives of another mesh. If more primitives have been received then the method passes back to step S604 and the method repeats from that point for the next primitives, e.g. of the next mesh. If there are no more primitives to process in the tiling unit 208 then the method passes from step S622 to step S624 in which the method ends.

When the primitives for an image have been processed then the display lists in the memory $204_1$ are complete for the tiles of the rendering space for the image Furthermore, the primitives (e.g. in primitive blocks) are outputted from the tiling unit 208 and stored in the memory $204_1$. The rasterization block 210 can then subsequently fetch the display list for a tile and the primitives relevant to that tile from the memory $204_1$, such that the HSR module 212 can perform hidden surface removal to thereby remove fragments of primitives which are hidden in the scene. The remaining fragments are passed to the texturing/shading module 214 which performs texturing and/or shading on the fragments to determine pixel colour values of a rendered image which can be passed to the memory $204_2$ for storage in a frame buffer. The rasterization block 210 processes each of the tiles and when the whole image has been rendered and stored in the memory $204_2$, the image can be outputted from the graphics processing system 200 and, for example, displayed on a display.

Figure 6:
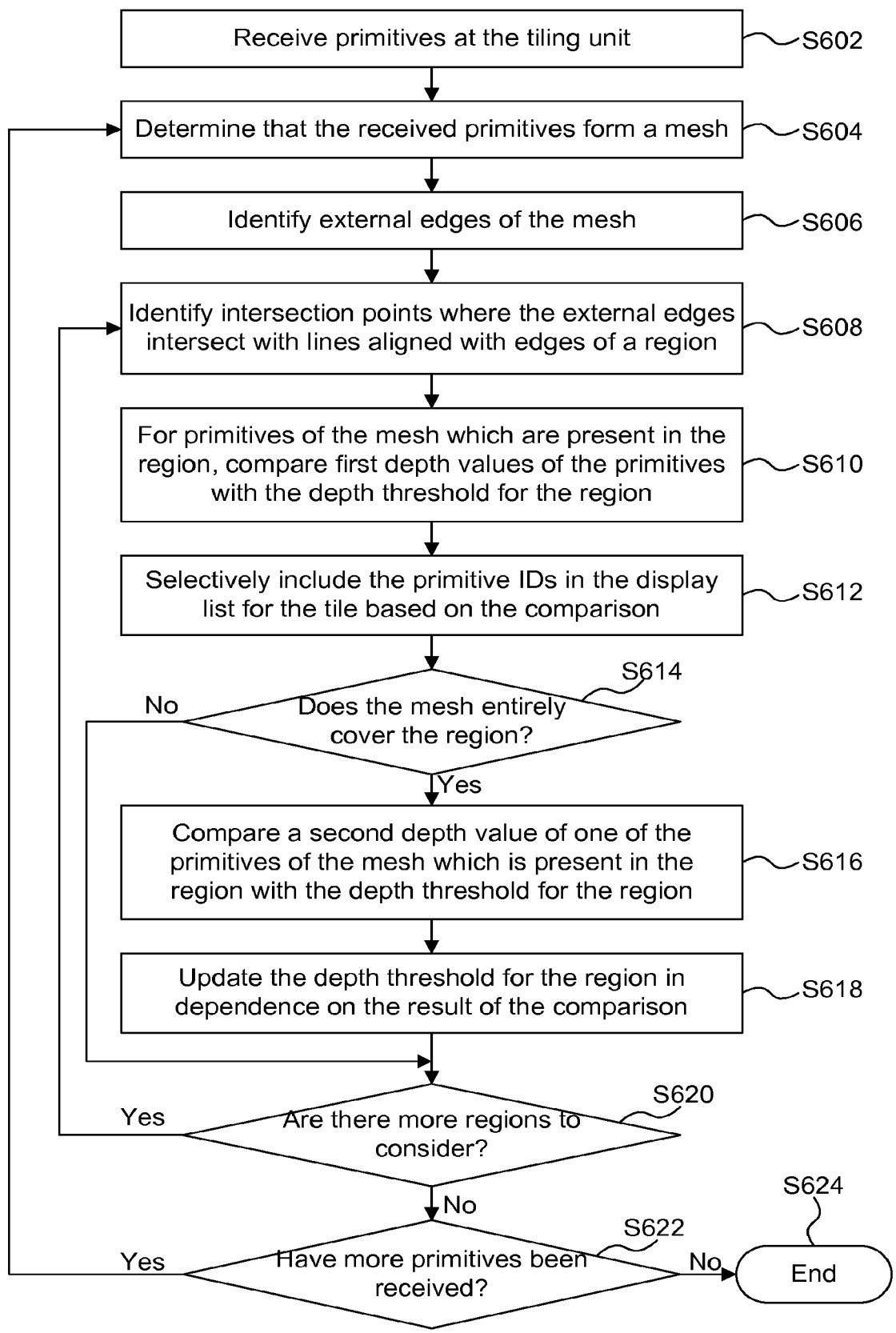
FIG. 6 is a flow chart illustrating a first method of assigning primitives to tiles at a tiling unit.

It can therefore be appreciated that the method described above with reference to the flow chart shown in FIG. 6 allows the tiling unit 208 to assign primitives to tiles of the rendering space by creating display lists for the tiles, wherein the depth threshold(s) for a region can be updated when a mesh of primitives entirely covers the region. Updating the depth threshold(s) for the region will allow more primitives to be culled by the tiling logic 216 which will therefore reduce the number of primitive IDs included in the display lists. It is much more likely that a mesh of primitives will entirely cover a region of the rendering space than it is that a single primitive will entirely cover the region of the rendering space.

In the flow chart shown in FIG. 6, steps S604, S606 and S608 are performed before steps S610 and S612. In other examples, steps S610 and S612 may be performed before steps S604, S606 and S608, and the mesh logic 218 might only perform steps S604, S606 and S608 to determine whether the received primitives form a mesh which entirely covers the region if the primitive's IDs have been included in the display list for the tile. This has the advantage of avoiding the processing associated with steps S604, S606 and S608 for primitives which are culled, but this has the drawback of repeating steps S604 and S606 for each region in which the primitives are present.

Figure 9:
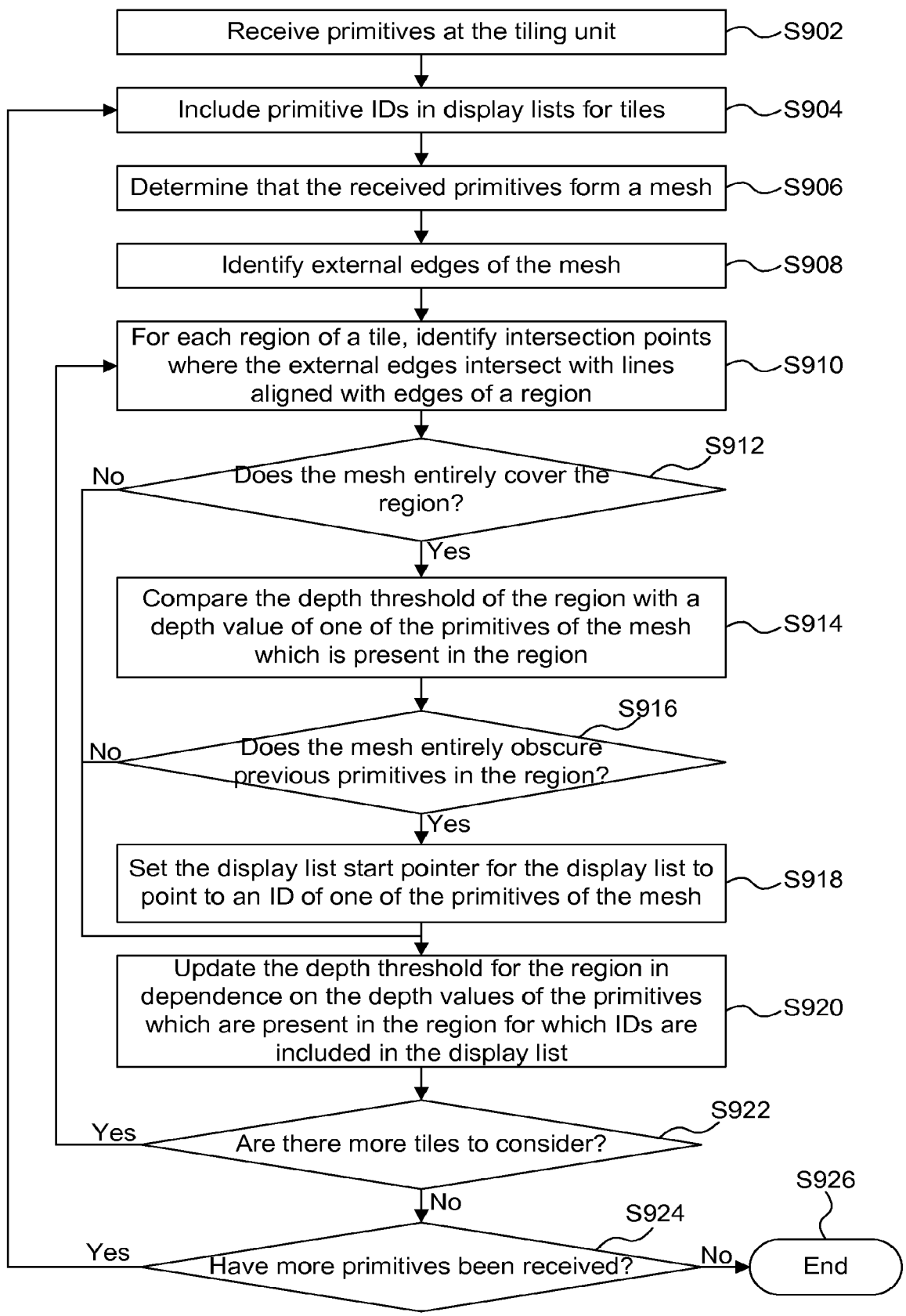
FIG. 9 is a flow chart illustrating a second method of assigning primitives to tiles at a tiling unit.

With reference to the flow chart shown in FIG. 9 there is now described a second method of assigning primitives to tiles at the tiling unit 208. This method uses the concept of determining whether a mesh or a single primitive entirely covers a region of the rendering space, but in this method, that information is used to move a start pointer of a display list for a tile if primitives whose IDs are included in the display list are hidden by a subsequent set of one or more primitives (e.g. a mesh or a single primitive) which entirely covers the tile. That is, if a primitive, or a mesh of primitives entirely covers all of the regions of the tile such that all of the previous primitives in the tile are obscured (i.e. hidden) then a start pointer of the display list can be moved to thereby skip the obscured primitives. In this way, the HSR module 212 will not fetch the previous primitives which would ultimately be hidden by the set of one or more primitives which entirely covers the region. This method therefore reduces the number of primitives which are fetched from the memory $204_1$ by the HSR module 212. The method is described below with reference to the mesh of primitives 506 shown in FIG. 5 which entirely covers the region 504, but would also apply to the mesh of primitives 706 or 806 shown in FIGS. 7 and 8 respectively, and would also apply to the case of a single primitive entirely covering the region(s) of a tile. It is noted that the mesh 706 does not entirely cover the region 704 and as such, in that case, it will be determined that the display list start pointer cannot be moved.

Step S902 is similar to step S602 described above with reference to FIG. 6. That is, in step S902 primitives of the mesh 506 are received at the tiling unit 208. In some examples, the primitives might not form meshes, and the methods described below can apply to single primitives as well as to meshes of primitives. In general, the methods described below can apply to a received set of one or more primitives.

In step S904 the tiling logic 216 includes, in the display list for the tile of which the region 504 is a part, indications of primitives which are present within the region 504, to thereby assign the primitives to the tile. Step S904 may include depth testing such as that described above such that some primitives are culled and not included in the display list for the tile if they fail a depth test against a depth threshold for the region 504 of the tile. However, step S904 may simply include assigning primitives to tiles based on whether the primitives are present within the tiles, irrespective of the depths of the primitives. The display lists are stored in the memory 2041.

In the example in which the received primitives form a mesh, in step S906 the mesh logic 218 determines that the received primitives form a mesh in a similar manner to as described above with reference to step S604, e.g. by determining that primitive edges are shared by a plurality of the received primitives.

In the example in which the received primitives form a mesh, in step S908 the mesh logic 218 identifies external edges of the mesh 506 in a similar manner to as described above with reference to step S606. The external edges of the mesh 506 describe the outer edges of the mesh formed by the plurality of primitives. For example, as described above, the external edges of the mesh 506 may be identified by identifying primitive edges which are not shared by multiple primitives of the mesh 506. As can be seen in FIG. 5, the shared edges $518_1$ and $518_2$ are internal edges of the mesh 506 and the edges of the primitives of the mesh 506 which are not shared by more than one of the primitives are the external edges of the mesh 506. It is the external edges of the mesh 506 which describe the extent of the coverage of the mesh 506.

In the example in which the received primitives form a mesh, in step S910, for each region of a tile (e.g. for region 504), the mesh logic 218 identifies intersection points (e.g. points $510_1$, $510_2$, $512_1$, $512_2$, $514_1$, $514_2$, $516_1$ and $516_2$ shown in FIG. 5) where the identified external edges of the mesh 506 intersect with the lines (e.g. 5081, 5082, $508_3$ and $508_4$) which are aligned with (and extend from) the edges of the polygonal region 504.

In step S912, the intersection points determined in step S910 are used to determine whether the mesh 506 entirely covers the region 504. This is done for each of the one or more regions of a tile. This can be done as described above, e.g. by, for each edge of the region 504, determining whether a pair of consecutive intersection points on the line 508 aligned with the edge encompass the edge of the region 504 on the line 508, with the section between the consecutive intersection points on the line 508 being within the mesh 506. If, for each edge of the polygonal region 504, a pair of consecutive intersection points encompass the edge of the region 504 with the section between the consecutive intersection points on the line 508 being within the mesh 506, then it is determined that the mesh 506 entirely covers the region 504. Alternatively, the identified intersection points can be used to determine whether the mesh 506 entirely covers the polygonal region 504 of the tile by determining whether there are any intersection points on the edges of the region 504, and determining that at least one point on an edge of the region 504 is covered by the mesh 506. If there are no intersection points on the edges of the region 504 and at least one point on an edge of the region 504 is covered by the mesh 506, then it is determined that the mesh 506 entirely covers the region 504. In examples in which single convex primitives are considered, then in step S912 it is determined whether a primitive entirely covers the region 504. This can be done, for example as described above, by determining whether all of the corners of the region 504 are within the single convex primitive.

If the mesh 506 does entirely cover the region 504 then the method passes to step S914 and the mesh logic 218 sends a signal to the tiling logic 216 to indicate that the mesh 506 does cover the entire region 504. The same applies in more general examples in which a set of one or more primitives entirely covers the region 504. The description below relates to the case of the mesh 506 entirely covering the region 504, but the same principles would also apply to the case of a single primitive entirely covering the region 504. In step S914 the tiling logic 216 retrieves a depth threshold for the region 504 from the depth threshold memory 222. The tiling logic 216 also determines a depth value for at least one of the primitives of the mesh 506 which is present within the region 504. The tiling logic 216 then compares the depth threshold for the region 504 with the depth value for the at least one of the received primitives of the mesh 506. This comparison is for the purpose of determining whether the mesh 506 entirely obscures previous primitives in the region 504, and in step S916 the tiling logic 216 determines whether the mesh 506 entirely obscures previous primitives in the region 504 which are included in the display list for the tile. For example, the mesh 506 may lie completely in front of all of the previous primitives for which IDs have been included in the display list for a tile, such that the mesh 506 may obscure (i.e. hide) the previous primitives in the region 504. This means that when the HSR module 212 performs the hidden surface removal for the tile including the region 504 then it will determine that the previous primitives are hidden by the mesh 506 in the region 504.

Step S916 takes account of the type of the primitives in the mesh 506. It is noted that "punch through" primitives as described herein are primitives for which the visibility of pixels in the primitives are shader-dependent. For example, some types of primitives (e.g. opaque primitives) may completely obscure primitives which lie behind them, whereas some other types of primtiives (e.g. translucent or punch through primitives) might not completely obscure primitives which lie behind them. Therefore the tiling logic 216 can determine that the mesh 506 entirely obscures the previous primitives in the region 504 if the primitives of the mesh 506 which cover the region 504 are opaque primitives, but not if the primitives of the mesh 506 which cover the region 504 are translucent or punch through primitives or primitives with shader-dependent depths. Fragments of punch through primitives can have their presence altered by the texturing and shading module 214, i.e. the texturing/shading module 214 can determine that some fragments of punch through primitives are not present such that they do not obscure the primitives lying behind them. Furthermore, fragments of primitives with shader-dependent depths can have their depth values altered by the texturing and shading module 214, which may alter any determination that the tiling unit 208 can make as to whether these primitives obscure other primitives in the region 504. Therefore, the tiling logic 216 does not determine that the mesh 506 entirely obscures the previous primitives in the region 504 which are included in the relevant display list if the primitives of the mesh, or if the previous primitives, have shader-dependent depths.

Similarly to as described above, the depth value for the at least one of the primitives of the mesh 506 which is compared with the depth threshold for the region 504 is the depth value of a primitive of the mesh 506 in the region 504 at one of:
 (i) an intersection of an edge of the primitive with an edge of the region 504;
 (ii) the position of a corner of the region 504 within the primitive; and
 (iii) a vertex of the primitive within the region.

If the depth compare mode is the less than compare mode (DCM_LESS), or the less than or equal to compare mode (DCM_LESS_EQ) then the depth value for the at least one of the received primitives of the mesh 506 is the maximum depth value of any of the primitives of the mesh 506 within the region 504 (referred to herein as "Mesh."). Furthermore, if the depth compare mode is the less than compare mode (DCM_LESS) then the tiling logic 216 determines that the mesh 506 entirely obscures previous primitives in the region 504 if the maximum depth value (Mesh.) of any of the primitives of the mesh 506 within the region 504 is less than the minimum depth threshold ($Thresh_{min}$) for the region 504 of the tile, because this means that the highest depth value of the mesh 506 within the region 504 is less than the minimum depth value of any previous primitives in the region 504, such that the mesh 506 entirely obscures the previous primitives in the region 504. If the depth compare mode is the less than or equal to compare mode (DCM_LESS_EQ) then the tiling logic 216 determines that the mesh 506 entirely obscures previous primitives in the region 504 if the maximum depth value (Mesh.) of any of the primitives of the mesh 506 within the region 504 is less than or equal to the minimum depth threshold ($Thresh_{min}$) for the region 504 of the tile, because this means that the highest depth value of the mesh 506 within the region 504 is less than or equal to the minimum depth value of any previous primitives in the region 504, such that the mesh 506 entirely obscures the previous primitives in the region 504.

If the depth compare mode is the greater than compare mode (DCM_GREATER), or the greater than or equal to compare mode (DCM_GREATER_EQ) then the depth value for the at least one of the received primitives of the mesh 506 is the minimum depth value of any of the primitives of the mesh 506 within the region 504 (referred to herein as "Mesh."). Furthermore, if the depth compare mode is the greater than compare mode (DCM_GREATER) then the tiling logic 216 determines that the mesh 506 entirely obscures previous primitives in the region 504 if the minimum depth value ($Mesh_{min}$) of any of the primitives of the mesh 506 within the region 504 is greater than the maximum depth threshold ($Thresh_{max}$) for the region 504 of the tile, because this means that the lowest depth value of the mesh 506 within the region 504 is greater than the maximum depth value of any previous primitives in the region 504, such that the mesh 506 entirely obscures the previous primitives in the region 504. If the depth compare mode is the greater than or equal to compare mode (DCM_GREATER_EQ) then the tiling logic 216 determines that the mesh 506 entirely obscures previous primitives in the region 504 if the minimum depth value (Mesh$_{min}$) of any of the primitives of the mesh 506 within the region 504 is greater than or equal to the maximum depth threshold (Thresh$_{max}$) for the region 504 of the tile, because this means that the lowest depth value of the mesh 506 within the region 504 is greater than or equal to the maximum depth value of any previous primitives in the region 504, such that the mesh 506 entirely obscures the previous primitives in the region 504.

If the tiling logic 216 determines that the mesh 506 does entirely obscure the previous primitives in the region 504 then the method passes to step S918. If the mesh 506 entirely obscures the previous primitives in all of the one or more regions of the tile then in step S918 the tiling logic 216 sets a display list start pointer to indicate that an indication of one of the primitives of the mesh 506 is a starting point in the display list for the tile. The display list start pointer may be a display list start address which indicates the address within the display list which is to be the starting point in the display list for the tile.

Figure 10:
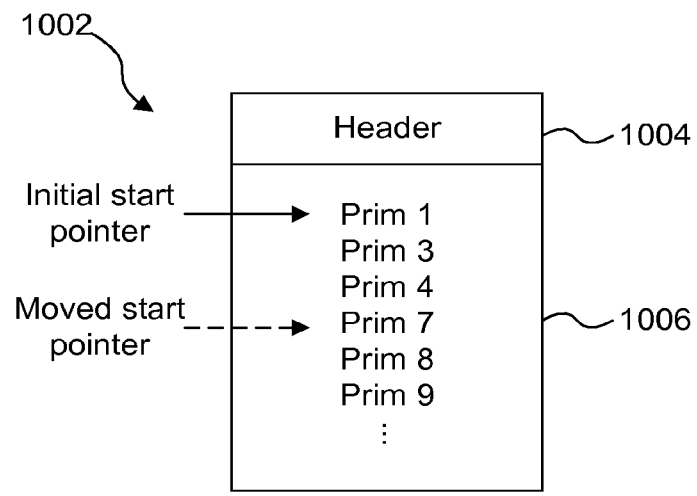
FIG. 10 is a representation of a display list of a tile.

FIG. 10 shows an example of a display list 1002 for a tile. The display list 1002 includes a header 1004 and a set of primitive IDs 1006 which indicate the primitives which are present within the tile. It is noted that, in some examples the display lists for multiple tiles may be included in the same data structure but for each primitive ID in the data structure an indication of a tile allows the display lists for the different tiles to be identified. FIG. 10 shows the primitive IDs 1006 which are relevant for a tile. Initially, a start pointer may point to the first primitive ID in the display list 1002. This means that when the HSR module 212 reads the display list 1002 it would start, as indicated by the start pointer, at the first primitive ID in the display list 1002 and would fetch the identified primitive, and then subsequently fetch the subsequent primitives which are subsequently identified in the display list 1002. The HSR module 212 would then process the primitives in the order in which they are indicated in the display list 1002 to thereby perform hidden surface removal on the primitives in the tile. As an example, primitives 7, 8 and 9 shown by the respective IDs in the display list 1002 may be the primitives forming the mesh 506 and the primitives 1, 3 and 4 shown by the respective IDs in the display list 1002 may be previous primitives which are included in the display list 1002 but which are completely obscured by the mesh 506. Therefore, in step S918, the start pointer for the display list 1002 can be set to point to the ID of primitive 7 (i.e. the first primitive of the mesh 506 which is included in the display list 1002). In this way, when the HSR module 212 reads the display list 1002, it will start at the ID of primitive 7, such that it will not fetch the primitives 1, 3 or 4. Primitives 1, 3 and 4 are not needed by the HSR module 212 for processing the tile because they are completely obscured by the mesh 506 in the tile. Therefore, by moving the start pointer for the display list 1002 the number of primitives which are fetched by the HSR module 212 can be reduced. This can help to reduce the amount of data that is transferred between the GPU 202 and the memories 204.

In some examples, the obscured primitive IDs may be left in the display list 1002. In other examples, the obscured primitive IDs may be removed from the display list 1002, which would reduce the amount of memory used by the display list 1002.

Irrespective of whether the mesh 506 entirely covers the region 504 and irrespective of whether the mesh 506 entirely obscures the previous primitives in the region 504, the method includes step S920. In step S920, the depth threshold updating logic 220 updates the depth threshold for the region in dependence on depth values of received primitives which are present within the region 504 and for which indications are included in the display list 1002 for the tile. The updated depth threshold is stored in the depth threshold memory 222. For example, in the less than depth compare mode (DCM LESS) and the less than or equal to depth compare mode (DCM_LESS_EQ) the depth threshold updating logic 220 compares the minimum depth of any of the primitives of the mesh 506 within the region 504 (Mesh$_{min}$) with the minimum threshold for the region 504 (Thresh$_{min}$), and if Mesh$_m$, <Thresh$_{min}$ then the depth threshold, Thresh$_{min}$ is updated to be equal to Mesh$_{min}$. In this way the depth threshold for the region 504 indicates the minimum depth of any primitive which is present within the region 504 and which is currently identified by a primitive ID in the display list 1002.

Similarly, in the greater than depth compare mode (DCM GREATER) and the greater than or equal to depth compare mode (DCM_GREATER_EQ) the depth threshold updating logic 220 compares the maximum depth of any of the primitives of the mesh 506 within the region 504 (Mesh$_{max}$) with the maximum threshold for the region 504 (Thresh$_{max}$), and if Mesh$_{max}$>Thresh$_{max}$ then the depth threshold, Thresh$_{max}$ is updated to be equal to Mesh$_{max}$. In this way the depth threshold for the region 504 indicates the maximum depth of any primitive which is present within the region 504 and which is currently identified by a primitive ID in the display list 1002.

In step S922 it is determined whether there are more tiles of the rendering space to consider with the primitives of the mesh 506. That is, it is determined whether the mesh 506 extends over other tiles. If the mesh 506 does extend over other tiles then the method passes back to step S910 and the method repeats from that point for the next tile.

If there are no more tiles to consider for the mesh 506 then the method passes from step S922 to step S924. In step S924 it is determined whether more primitives have been received at the tiling unit 208, e.g. primitives of another mesh. If more primitives have been received then the method passes back to step S904 and the method repeats from that point for the next primitives, e.g. of the next mesh. If there are no more primitives to process in the tiling unit 208 then the method passes from step S924 to step S926 in which the method ends.

As described above, when the primitives for an image have been processed then the display lists in the memory 204$_1$ are complete for the tiles of the rendering space for the image. Furthermore, the primitives (e.g. in primitive blocks) are sent from the tiling unit 208 and stored in the memory 204$_1$. The rasterization block 210 can subsequently retrieve the display list for a tile and the primitives relevant to that tile from the memory 204$_1$ and the HSR module 212 can then perform hidden surface removal on the primitives indicated by the primitive IDs in the display list as being present in the tile, to thereby remove fragments of primitives which are hidden in the scene. The remaining fragments are passed to the texturing/shading module 214 which performs texturing and/or shading on the fragments to determine pixel colour values of a rendered image which can be passed to the memory 204$_2$ for storage in a frame buffer. The rasterization block 210 processes each of the tiles and when the whole image has been rendered and stored in the memory 204$_2$, the image can be outputted from the graphics processing system 200 and, for example, displayed on a display.

The method described above with reference to FIG. 9 refers to the example shown in FIG. 5 in which the mesh 506 entirely covers the region 504. As mentioned above, the method may also be applied in other examples, such as in the example shown in FIG. 7 of the mesh 706 partially covering the region 704 (although in this case the display list start pointer will not be moved since the mesh 706 does not entirely cover the region 704), or the example shown in FIG. 8 of the mesh 806 entirely covering the region 804, or in an example in which a single primitive entirely covers a region.

The logic blocks of the tiling unit 208 (e.g. logic blocks 216, 218 and 220) may be implemented on the GPU 202 in hardware or software or a combination thereof. For example, if the logic blocks 216, 218 and 220 are implemented in hardware they may be formed as particular arrangements of transistors and other hardware components suited for performing the desired functions of the logic blocks as described herein. In contrast, if the logic blocks 216, 218 and 220 are implemented in software they may comprise sets of computer instructions which can be stored in a memory and can be provided to the GPU 202 for execution thereon. Furthermore, although in the examples described herein, the graphics processing system uses a GPU, in other examples a general purpose processing unit, e.g. a CPU, could be used to implement the functionality which is described herein as being implemented on the GPU 202.

Figure 11:
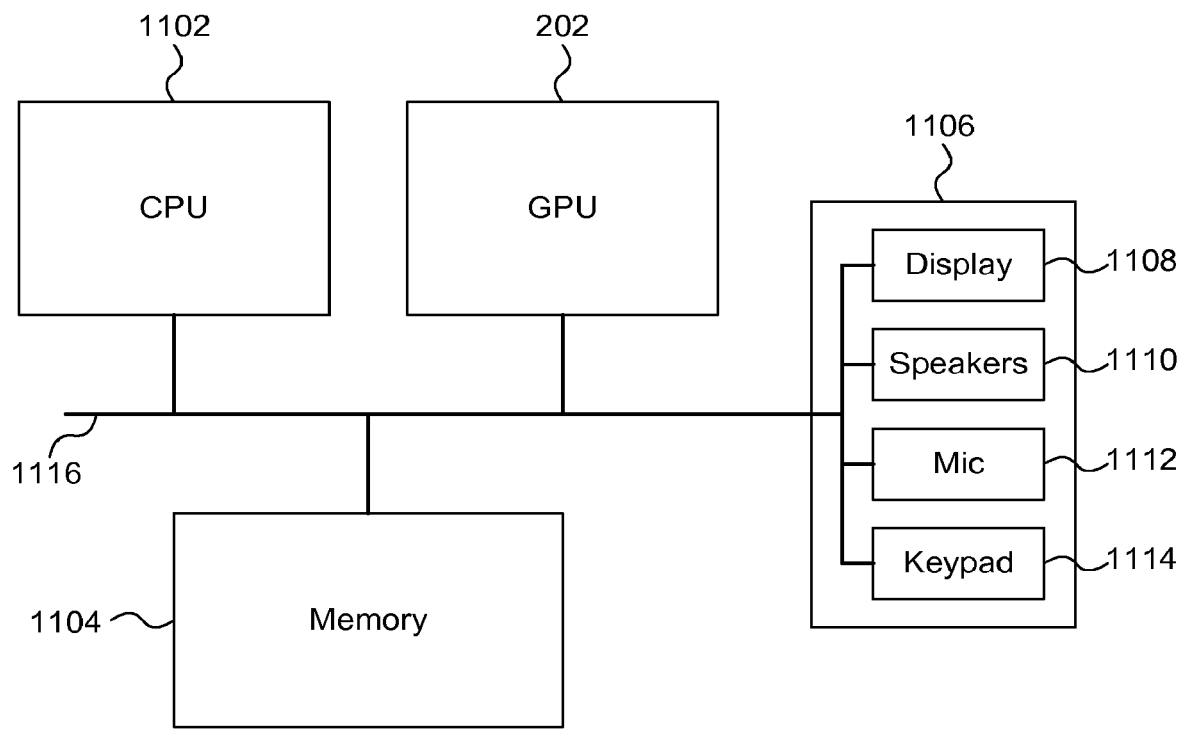
FIG. 11 is a schematic diagram of a computer system.

The graphics processing system 200 described above can be implemented in a computer system. For example, FIG. 11 shows a computer system which comprises the GPU 202, a CPU 1102 and a memory 1104, wherein the memory 1104 may include memory blocks corresponding to memories $204_1$ and $204_2$ described above. The computer system also comprises other devices 1106, such as a display 1108, speakers 1110, a microphone 1112 and a keypad 1114. The components of the computer system can communicate with each other via a communications bus 1116. Computer program code for an application may be stored in the memory 1104, and may for example be executed on the CPU 1102. If the application needs to render an image of a 3D scene, the primitives can be sent to the GPU 202, and the GPU 202 can render the scene as described above.

Generally, any of the functions, methods, techniques or components described above (e.g. the tiling unit 208 and its components) can be implemented in modules using software, firmware, hardware (e.g., fixed logic circuitry), or any combination of these implementations. The terms "module," "functionality," "component", "block", "unit" and "logic" are used herein to generally represent software, firmware, hardware, or any combination thereof.

In the case of a software implementation, the module, functionality, component, unit or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component, unit or logic (e.g. the logic blocks of the tiling unit 208) may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component, unit or logic (e.g. the logic blocks of the tiling unit 208) may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component, unit or logic described above, such as HDL (hardware description language) software, as is used for designing integrated circuits, or for configuring programmable chips, to carry out desired functions. That is, there may be provided a computer readable storage medium having encoded thereon computer readable program code for generating a tiling unit for use in a graphics processing system comprising a GPU configured to perform any of the methods described herein, or for generating a tiling unit for use in a graphics processing system comprising any apparatus described herein. For example, a non-transitory computer readable storage medium may have stored thereon computer readable instructions that, when processed at a computer system for generating a manifestation of an integrated circuit, cause the computer system to generate a manifestation of a tiling unit as described in the examples herein. The manifestation of the tiling unit could be the tiling unit itself, or a representation of the tiling unit (e.g. a mask) which can be used to generate the tiling unit.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

What is claimed is:

1. A method of assigning primitives to tiles in a graphics processing system which has a rendering space subdivided into a plurality of tiles, wherein each tile comprises one or more regions, the method comprising:
   if it is determined that a mesh comprising a plurality of primitives entirely covers a region of a tile even though no single primitive of the mesh entirely covers the region of the tile, selectively updating a depth threshold for the region in dependence on a depth value for at least one of the primitives of the mesh which is present within the region of the tile; and
   selectively assigning, to the tile, one or more of the primitives of the mesh which are present within the region of the tile, in dependence on the depth threshold for the region.

2. The method of claim 1 wherein said selectively updating a depth threshold for the region comprises updating the depth threshold for the region in dependence on a comparison of the depth threshold for the region with the depth value for said at least one of said plurality of the primitives of the mesh which is present within the region of the tile.

3. The method of claim 1 wherein said selectively assigning, to the tile, one or more of the primitives of the mesh which are present within the region of the tile comprises, for each of a plurality of the primitives which are present within the region of the tile:
   comparing a depth value for the primitive with the depth threshold for the region, and
   in dependence on the result of the comparison, selectively including an indication of the primitive in a display list for the tile to thereby assign the primitive to the tile.

4. The method of claim 1 wherein each tile comprises one region such that the regions are tiles, or wherein each tile comprises a plurality of regions such that the regions are subtiles.

5. The method of claim 1 further comprising:
   receiving a mesh comprising a plurality of primitives; and
   determining whether the mesh entirely covers the region of the tile.

6. The method of claim 5 further comprising identifying external edges of the mesh, wherein the identified external edges of the mesh are used to determine whether the mesh entirely covers the region of the tile by identifying intersection points where the identified external edges of the mesh intersect with lines aligned with the edges of the region of the tile, and using the identified intersection points to determine whether the mesh entirely covers the region of the tile.

7. The method of claim 6 wherein said using the identified intersection points to determine whether the mesh entirely covers the region of the tile comprises, for each edge of the region:
   determining whether a pair of consecutive intersection points on the line aligned with the edge encompass the edge of the region on the line, with the section between the consecutive intersection points on the line being within the mesh, wherein if, for each edge of the region, a pair of consecutive intersection points encompass the edge of the region with the section between the consecutive intersection points on the line being within the mesh, then it is determined that the mesh entirely covers the region.

8. The method of claim 6 wherein said using the identified intersection points to determine whether the mesh entirely covers the region of the tile comprises:
   determining whether there are any intersection points on the edges of the region; and
   determining that at least one point on an edge of the region is covered by the mesh;
   wherein if there are no intersection points on the edges of the region and at least one point on an edge of the region is covered by the mesh, then it is determined that the mesh entirely covers the region.

9. A tiling unit configured to assign primitives to tiles in a graphics processing system which has a rendering space subdivided into a plurality of tiles, wherein each tile comprises one or more regions, wherein the tiling unit comprises:
   depth threshold updating logic configured to, if it is determined that a mesh comprising a plurality of primitives entirely covers a region of a tile even though no single primitive of the mesh entirely covers the region of the tile, selectively update a depth threshold for the region in dependence on a depth value for at least one of the primitives of the mesh which is present within the region of the tile; and
   tiling logic configured to selectively assign, to the tile, one or more of the primitives of the mesh which are present within the region of the tile, in dependence on the depth threshold for the region.

10. The tiling unit of claim 9 further comprising mesh logic configured to:
    identify external edges of the mesh;
    identify intersection points where the identified external edges of the mesh intersect with lines aligned with the edges of the region of the tile; and
    use the identified intersection points to determine whether the mesh entirely covers the region of the tile.

11. The tiling unit of claim 10 wherein the mesh logic is further configured to use the identified intersection points to determine whether the mesh entirely covers the region of the tile by, for each edge of the region:
    determining whether a pair of consecutive intersection points on the line aligned with the edge encompass the edge of the region on the line, with the section between the consecutive intersection points on the line being within the mesh, wherein if, for each edge of the region, a pair of consecutive intersection points encompass the edge of the region with the section between the consecutive intersection points on the line being within the mesh, then it is determined that the mesh entirely covers the region.

12. The tiling unit of claim 10 wherein the mesh logic is further configured to use the identified intersection points to determine whether the mesh entirely covers the region of the tile by:
   determining whether there are any intersection points on the edges of the region; and
   determining that at least one point on an edge of the region is covered by the mesh;
   wherein if there are no intersection points on the edges of the region and at least one point on an edge of the region is covered by the mesh, then it is determined that the mesh entirely covers the region.

13. The tiling unit of claim 10 wherein the mesh logic is further configured to identify the external edges of the mesh by identifying primitive edges which are not shared by multiple primitives of the mesh.

14. The tiling unit of claim 9 further comprising mesh logic configured to determine that received primitives form a mesh by determining that primitive edges are shared by a plurality of the received primitives.

15. The tiling unit of claim 9 wherein the depth threshold updating logic is further configured to determine the depth value for the at least one of said plurality of the primitives of the mesh to be the depth value of the primitive at one of:
   (i) an intersection of an edge of the primitive with an edge of the region;
   (ii) the position of a corner of the region within the primitive; and
   (iii) a vertex of the primitive within the region.

16. The tiling unit of claim 9 wherein a depth compare mode comprises one of:
   (a) a less than compare mode, or a less than or equal to compare mode,
      wherein the tiling logic is configured to determine a depth value of a primitive within the region to be a minimum depth value of the primitive within the region, and
      wherein the depth threshold updating logic is configured to determine a depth value to be a maximum depth value of any of the primitives of the mesh within the region; and
   (b) a greater than compare mode, or a greater than or equal to compare mode,
      wherein the tiling logic is configured to determine a depth value of a primitive within the region to be a maximum depth value of the primitive within the region, and
      wherein the depth threshold updating logic is configured to determine a depth value to be a minimum depth value of any of the primitives of the mesh within the region.

17. The tiling unit of claim 9 further comprising a memory,
   wherein the tiling logic is further configured to read the depth threshold for a region of a tile from the memory; and
   wherein the depth threshold updating logic is further configured to store the depth threshold for the region in the memory if the depth threshold for the region is updated.

18. The tiling unit of claim 9 further comprising mesh logic configured to determine whether the mesh entirely covers the region of the tile.

19. A non-transitory computer readable storage medium having stored thereon computer readable instructions that, when processed at a computer system for generating a manifestation of an integrated circuit, cause the computer system to generate a manifestation of a tiling unit configured to assign primitives to tiles in a graphics processing system which has a rendering space subdivided into a plurality of tiles, wherein each tile comprises one or more regions, wherein the tiling unit comprises:
   depth threshold updating logic configured to, if it is determined that a mesh comprising a plurality of primitives entirely covers a region of a tile even though no single primitive of the mesh entirely covers the region of the tile, selectively update a depth threshold for the region in dependence on a depth value for at least one of the primitives of the mesh which is present within the region of the tile; and
   tiling logic configured to selectively assign, to the tile, one or more of the primitives of the mesh which are present within the region of the tile, in dependence on the depth threshold for the region.

* * * * *

UNITED STATES PATENT AND TRADEMARK OFFICE
CERTIFICATE OF CORRECTION

PATENT NO. : 10,692,275 B2
APPLICATION NO. : 16/115165
DATED : June 23, 2020
INVENTOR(S) : Xile Yang Page 1 of 1

It is certified that error appears in the above-identified patent and that said Letters Patent is hereby corrected as shown below:

In the Specification

Column 6, Line 22, please replace "2042" with --- "$204_2$" ---.
Column 7, Line 26, please replace "Primmin" with --- "$Prim_{min}$" ---.
Column 7, Line 38, please replace "3042" with --- "$304_2$" ---.

Signed and Sealed this
Tenth Day of August, 2021

Drew Hirshfeld
*Performing the Functions and Duties of the
Under Secretary of Commerce for Intellectual Property and
Director of the United States Patent and Trademark Office*